United States Patent [19]
Clarkson et al.

[11] Patent Number: 5,559,798
[45] Date of Patent: Sep. 24, 1996

[54] DATA SEGMENTATION WITHIN A RENEGOTIATED BIT-RATE SERVICE TRANSMISSION SYSTEM

[75] Inventors: Kenneth L. Clarkson, Madison, N.J.; Matthias Grossglauser, Sophia-Antipolis, France; Srinivasan Keshav, Berkeley Heights; David Tse, New Providence, both of N.J.

[73] Assignee: Lucent Technologies Inc., Murray Hill, N.J.

[21] Appl. No.: 424,838

[22] Filed: Apr. 19, 1995

[51] Int. Cl.$^6$ ..................................................... H04Q 11/04
[52] U.S. Cl. ............................................. 370/60.1; 370/84
[58] Field of Search ................ 370/60, 60.1, 58.1–58.3, 370/84, 85.7, 94.1, 94.3, 95.1, 95.3, 112, 77, 79, 91, 92, 110.1

[56] References Cited

U.S. PATENT DOCUMENTS

| | | | |
|---|---|---|---|
| 4,727,536 | 2/1988 | Reeves et al. | 370/84 |
| 4,788,679 | 11/1988 | Kataoka et al. | 370/60 |
| 4,802,189 | 1/1989 | Wedler | 370/84 |
| 5,081,620 | 2/1990 | Girard et al. | 370/60 |
| 5,491,691 | 2/1996 | Shtayer et al. | 370/61 |

OTHER PUBLICATIONS

Song Chong, San-qi Li and Joydeep Ghosh, "Predictive Dynamic Bandwidth Allocation for Efficient Transport of Real–Time VBR Video over ATM," IEEE Journal on Selected Areas in Communications, vol. 13, No. 1, Jan. 1995.

*Primary Examiner*—Douglas W. Olms
*Assistant Examiner*—Ajit Patel
*Attorney, Agent, or Firm*—Robert P. Marley

[57] ABSTRACT

A system and method for the segmentation of data exhibiting an intrinsic long-term average data rate, punctuated with periods of peak rate data bursts. This segmentation conditions the data for efficient transmission via either a renegotiated constant bit-rate ("RCBR") network or a renegotiated variable bit-rate network ("RVBR") network. Within these networks, data transmission rates between a sender and a recipient are rapidly renegotiated as a function of previously stored data transmission demand information and system buffer levels. Such a system is responsive to the rate at which new calls or requests for connections enter and leave the network, the frequency and duration of extended peak rate data bursts, as well as the occurrence of short duration data transmission peaks.

12 Claims, 2 Drawing Sheets

DATA SEGMENTATION WITHIN A RENEGOTIATED BIT-RATE SERVICE TRANSMISSION SYSTEM

TECHNICAL FIELD

The invention relates to providing multiple-user access negotiated bit-rate service within a nonexclusive transmission network.

BACKGROUND OF THE INVENTION

With the advent of multimedia data and entertainment services, and the ever increasing popularity of the Internet, the importance of integrated services telecommunication networks ("ISNs") in the future communication infrastructure is fast becoming evident. Current designs for ISNs typically provide for three types of service: constant bit-rate ("CBR"), variable bit-rate ("VBR")) and available bit-rate ("ABR"). Present ISN designs provide for CBR service compatible with existing circuit-switched telecommunication networks. Similarly, ABR service is being designed for compatibility with the Internet and Internet-style data transfer applications. However, design considerations with respect to VBR have been dictated by considerations for future telecommunication traffic, with a particular emphasis being placed upon the transmission of compressed video information. This type of video information is generally characterized as having an intrinsic long-term average data rate, punctuated with periods of peak rate data bursts. To facilitate the transmission of such bursty traffic via a standard CBR service network each data burst would have to be smoothed out or reduced via buffering prior to entering the network (causing intolerable delays for real time video signals), or the CBR rate would have to be set at some value that was very close to the peak data rate of the video information being sent (squandering network resources and thereby severely limiting signal multiplexing within the network). Similarly, if such bursty video information is transmitted via an ABR service network, there is no guarantee that the "available" network resources will be sufficient to avoid unacceptable data delays and/or losses. Present designs for VBR network services, such as those discussed by A. E. Eckberg in B-ISDB/ATM Traffic and Congestion Control, IEEE Network, September 1992, pages 28–37, essentially augment standard CBR service with the ability to accommodate moderate data bursts.

To ensure that bursty data transmissions can be carried by a VBR network without unacceptable data delays and/or losses it is essential that the VBR network be provided with an accurate characterization of the data that will be sent. This characterization is communicated to a VBR network via traffic descriptors transmitted along with the data. To maintain data transmission efficiency within a VBR network, it is desirable to provide an accurate characterization of the traffic being sent by using as few traffic descriptors as possible. In practice this has proven to be quite difficult—especially where the data being sent is compressed video.

Compressed video data simply does not conform to the "moderately bursty" traffic model envisaged by designers of VBR service networks. As is well known in the art, compressed video data typically includes fairly long intervals (on the order of tens of seconds) where the data rate is very near what would have been considered the peak rate for the typical VBR model (see E. P. Rathgeb, Policing of Realistic VBR Video Traffic in an ATM Network, International Journal of Digital and Analog Communications Systems, vol. 6, pages 213–26, 1993; M. W. Garrett and W. Willinger, Analysis Modeling and Generation of Self-Similar VBR Video Traffic, ACM Sigcomm '94, pages 269–80, University College London, August 1994). These extended high-rate data bursts are due to scenes depicting considerable motion and/or quickly varying light levels. For such traffic, if a leaky-bucket type of traffic descriptor is used, one is faced with a series of poor choices.

For example, assume that the video data traffic is being routed through the system illustrated in FIG. 1. As shown, video data is sent from network subscriber site 100 to remote user location 101 via VBR network 102. In response to signal from processor 103, data is transmitted from compressed video source 104 to VBR network 102 by way of source buffer 105 and regulator 106. Regulator 106 is a "leaky-bucket" data regulator, a type that is well-known in the art. This type of regulator allows data to be output at a particular rate as a function of the availability of data tokens (107) within token bucket register 108. Tokens are "placed" in token bucket register 108 at a predetermined rate, and depleted as data passes through regulator 106—When token bucket 108 is empty, no additional data is permitted to pass through regulator 106. These tokens are virtual in nature; that is, they only serve to meter data flow through regulator 106, and are not inserted into the outgoing data stream. If the token availability/data rate of regulator 106 is chosen so that the rate of data output from regulator 106 approximates the average data rate at which data leaves compressed video source 104 (a condition that will maximize the statistical multiplexing gain within VBR network 102), and if the size of token bucket register 108 (i.e., the maximum number of tokens that may be held in this register) is fixed at a moderate level (so as to avoid overloading VBR network 102), then source buffer 105 will have to be very large in order to support an extended high-rate data burst from compressed video source 104. Barring the availability of such a large source buffer, data losses will occur. Even if source buffer 105 is made large enough to handle such sustained bursts of peak video transmission, the result is still far from ideal—Data losses will be avoided, but, due to the large source buffer, equipment expenses increase and long delays will be experienced with respect to source output.

Alternatively, if token bucket register 108 is made large enough to allow token regulator 106 to rapidly drain source buffer 105 of data gluts resulting from sustained video data bursts, then large network and remote user location buffers (109, 110) will be needed to avoid data losses and ensure proper delivery of a usable video signal to receiver/viewer 111. Furthermore, by allowing such bursts to be freely drained and launched into VBR network 102 a single network subscriber site is given the ability to disrupt VBR network 102 by flooding it with tens of megabytes of data.

Thus, the phenomenon of sustained peaks of high-rate data will result in either high data losses, large delays between source and recipient, or a disruption-prone unregulated VBR network environment. Given the current framework of VBR network service, there is no clear way to avoid all of these problems simultaneously. This is a simple consequence of the fact that the sustained peaks exhibited in compressed video data violate the basic design assumptions for VBR service.

SUMMARY OF THE INVENTION

The aforementioned problems are solved, in accordance with the principles of the invention, by providing for the :segmentation of data exhibiting an intrinsic long-term average data rate, punctuated with 5periods of peak rate data bursts. This segmentation conditions the data for efficient transmission via either a renegotiated constant bit-rate ("RCBR") network or a renegotiated variable bit-rate network ("RVBR") network. Within these networks, data transmission rates between a sender and a recipient are rapidly renegotiated as a function of previously stored data transmission rate information and system buffer levels. Such a system and method can be readily implemented within existing CBR and/or VBR network architectures. The RCBR and RVBR networks allow for the implementation of an intelligent data traffic management systems that are responsive to the rate at which new calls or requests for connections enter and leave the network, the frequency and duration of extended peak rate data bursts, as well as the occurrence of short duration data transmission peaks.

DETAILED DESCRIPTION OF THE INVENTION

Figure 1:
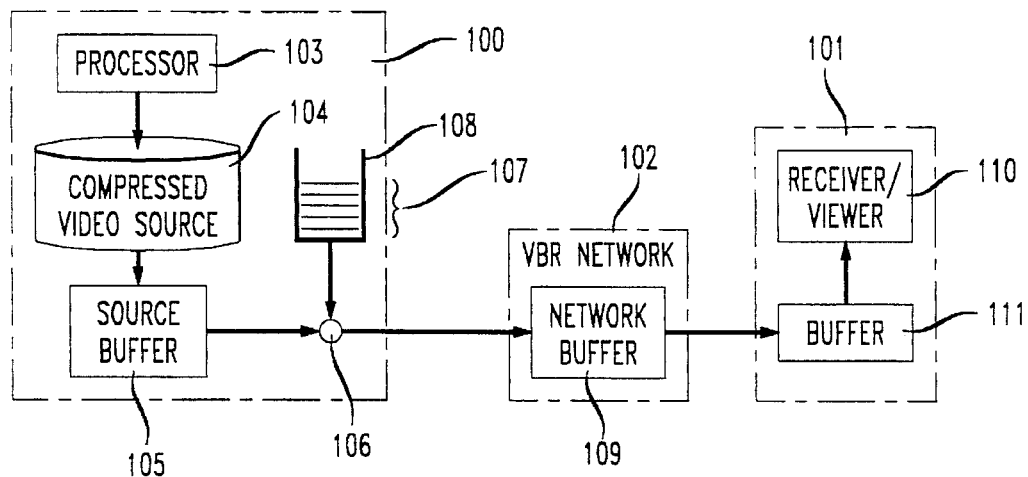
FIG. 1 shows, in simplified block diagram form, the architecture of a prior art VBR network data transmission system.
Figure 2:
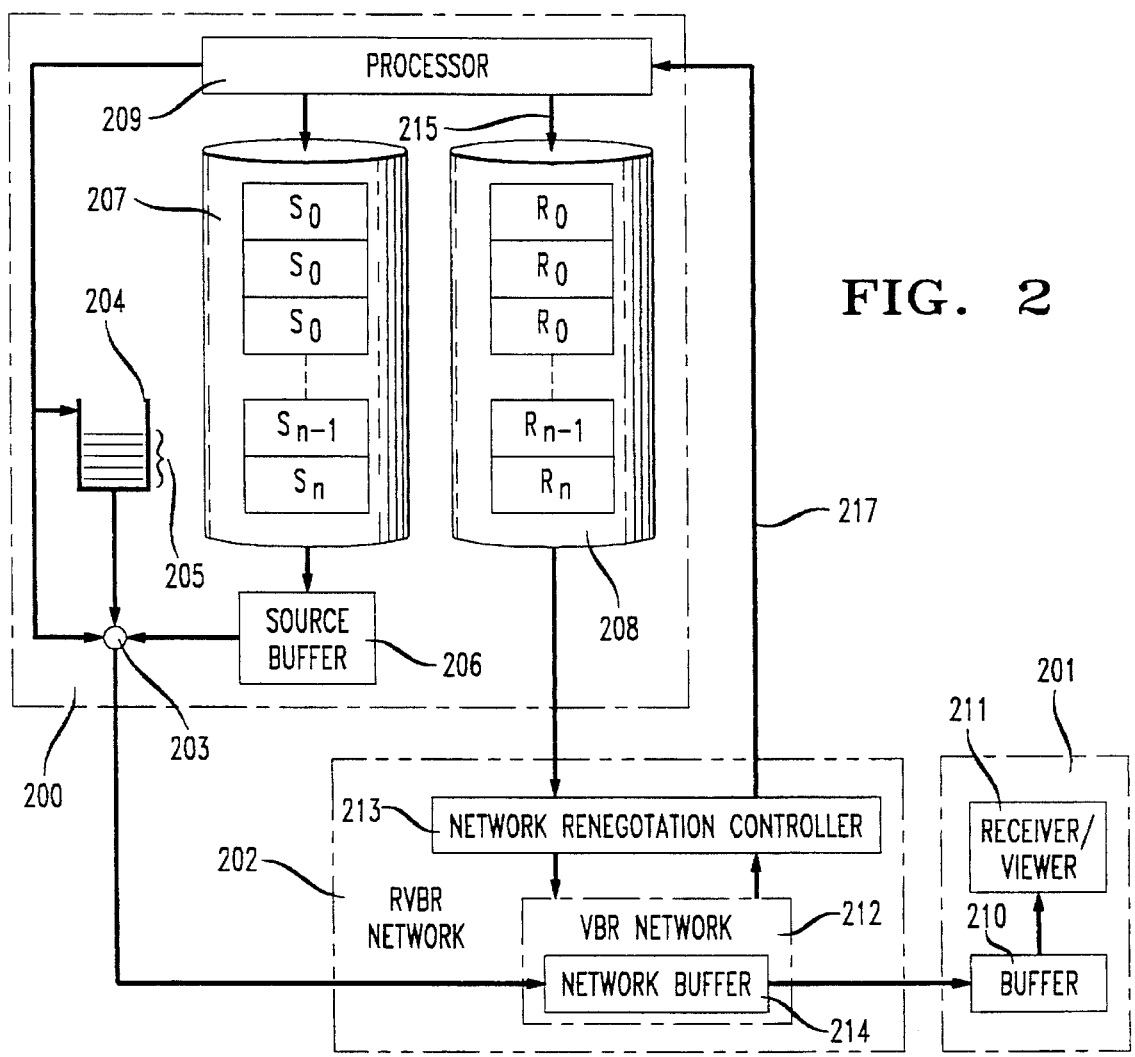
FIG. 2 shows, in simplified block diagram form, the architecture of a renegotiated VBR network including; an exemplary embodiment of the invention.

FIG. 2 shows, in simplified form, the architecture of an RVBR network adapted to facilitate the transmission of data that has been segmented in accordance with the invention. This particular type of network is the subject of the co-pending, and commonly assigned patent application entitled "Renegotiated Bit-Rate Service System And Method," which was filed on Apr. 19, 1995. The illustrated system comprises network subscriber site 200, remote user location 201, and RVBR network 202. As shown, network subscriber site includes leaky-bucket regulator 203, token bucket register 204, data tokens 205, source buffer 206, video source 207, video data transmission rate memory 208 and processor 209. Video source 207 contains a particular compressed video program that will be transmitted via RVBR Network 202 to remote user location 201. Video data transmission rate memory 208 contains a previously compiled record of the instantaneous transmission rates that will have to be maintained within RVBR network 202 in order to support the real time transmission of the compressed video program stored in video source 207. For example, to efficiently facilitate the transmission of a compressed video signal representing a typical movie, it will most likely be necessary to alter the transmission rate within RVBR network 202 every few seconds (due to varying levels of motion and/or light from scene to scene). Therefore, the record of the instantaneous transmission rates stored in memory 208 consists of a listing of rates, $R_0$ through $R_n$, each of which is indexed to a specific segment ($S_0$ through $S_n$) of the particular compressed video program stored within video source 207. Also, as shown in FIG. 2, RVBR network 202 consists of a conventional VBR network (212), which is managed by network renegotiation controller 213. RVBR network 202 is also shown to include buffer 214. Remote user location 201 is shown to include buffer 210 and receiver/viewer 211.

In operation, a signal from processor 209 serves to initiate the transmission of a particular compressed video data program from video source 207 to remote user location 201. This processor signal may be generated in response to a user request (as would be the case for interactive, request, or pay-per-view video systems), or the signal may be generated by processor 209 according to a predetermined timetable. The initiating signal is transmitted to video data transmission rate memory 208 via line 215. In response, the rate value $R_0$ (associated with the initial segment, $S_0$, of the particular compressed video data program stored within video source 207) is transmitted from video data transmission rate memory 208 to network renegotiation controller 213. The transmission of $R_0$ serves as a request for obtaining a connection within RVBR network 202 capable of supporting a data transmission of $R_0$ bits per second ("bps") between network subscriber site 200 and remote user location 201. Communications between video data transmission rate memory 208 and network renegotiation controller 213 are effected via out-of-band signaling connection 216. Systems facilitating out-of-band signaling between network subscriber sites and network controllers are well known in the art.

The operation of negotiating the requested $R_0$ transmission bandwidth within RVBR network 202 is performed by network renegotiation controller 213. This negotiation is similar to those performed at the initiation of call connections within ordinary VBR networks. A network switching system (in this case, network renegotiation controller 213) compares an incoming request for transmission bandwidth with available network resources. If the resources are available, the request is accepted, and the requesting subscriber is granted network access. If the request exceeds current network resources, the subscriber is denied access. Any one of a number of commercially-available programmable telecommunication network switching systems would be suitable to serve as network renegotiation controller (213) within the system of FIG.2. An example of one such switching system is the 4 ESS™ switch manufactured by AT&T Corp., and described in The Bell System Technical Journal, Vol. 56, No. 7, September 1977. Of course, there is a finite period, $t_{neg}$, required to receive a request, perform a bandwidth negotiation in response to that request, and establish network access for the requesting subscriber. Employing currently available switching systems, such as the 4 ESS™, within the system of FIG. 2 would result in $t_{neg}$ being on the order of 50 ms.

Assuming the $R_0$ request for bandwidth is successful, network renegotiation controller 213 transmits a confirmation signal to processor 209 via signaling connection line 217. This confirmation signal will arrive at processor 209 at time of approximately $t_0+t_{neg}$; where $t_0$ is the time at which the $R_0$ rate request was transmitted from video data transmission rate memory 208 to network renegotiation controller 213. Upon receipt of this confirmation, processor 209 adjusts the leaky-bucket regulator 203 and the amount of data tokens (205) within token bucket register 204 for the negotiated data rate. Processor 209 then instructs video source 207 to transmit data segment $S_0$ from network subscriber site 200 to remote user location 201.

At a time which is approximately $t_{neg}$ prior to the completion of the transmission of segment $S_0$, video data transmission rate memory 208 is instructed by processor 209 to transmit the rate value $R_1$ (associated with the compressed video segment $S_1$) to network renegotiation controller 213. This transmission of $R_1$ serves as a request for a connection within RVBR network 202 to support a data transmission of $R_1$ bps—The rate required to successfully transmit compressed video segment $S_1$. Assuming this request is successful, processor 209 receives a confirmation signal via signaling connection 217. In response, processor 209 adjusts leaky-bucket regulator 203 and token bucket register 204 accordingly, and then instructs video source 207 to transmit data segment $S_1$ from network subscriber site 200 to remote user location 201.

This request/negotiate/confirm/adjust/transmit sequence is repeated until all n segments of the compressed video program stored within video source 207 have been transmitted to remote user location 201.

RVBR network 202 is not assumed to be reserved for the exclusive use of any one user. Consequently, demands put upon the resources of RVBR network 202 by the simultaneous transmission of data between many subscribers and users will almost inevitably lead to the denial of one or more requests for bandwidth. If a request for bandwidth does fail, the system of FIG. 2 can be programmed to respond in one of three ways.

1) Reduction of the rate of compressed video data transmitted from video source 207.

Upon determination by network renegotiation controller 213 that the requested transmission rate is beyond the present capabilities of RVBR network 202, a signal indicative of such is transmitted to processor 209 via signaling connection 217. In response, processor 209 instructs video source 207 to reduce the compressed video data transmission rate (leaky-bucket regulator 203 and token bucket register 204 are also adjusted accordingly). This data rate reduction can be accomplished by degrading the video resolution and/or decreasing the video frame rate. Both of which result in the transmission of a lower quality video signal to remote user location 201. The degraded level of video transmission will continue at least until the completion of the next bandwidth negotiation sequence.

2) Reduction of the rate of video data transmitted through RVBR network 202.

In this scenario, when a particular transmission rate request fails, processor 209 does not instruct video source 207 to reduce the compressed video data transmission rate. However, in response to a signal indicative of the request failure, processor 209 adjusts leaky-bucket regulator 203 and token bucket register 204 to the particular data rate that RVBR network 202 will accommodate. Consequently, video source 207 transmits the next segment of compressed video data at the requested rate. As RVBR 202 is incapable of supporting such a transmission, video data will accumulate in source buffer 206. This accumulated data will be transmitted to remote user location 201 at whatever rate RVBR can support. Assuming source buffer 206 is large enough to handle the incoming volume of data from video source 207, there should be no loss of data as a result, just a delay in its reception at remote user location 201. Due to the danger of data loss if source buffer 206 is at or near capacity, processor 209 can be programmed so that the above described routine is only executed when source buffer 206 is relatively empty.

3) The connection is terminated and/or not established.

This most extreme option would usually be viewed as an undesirable result. However, the system of FIG. 2 could be programmed so that upon the failure of a request for bandwidth, the connection between network subscriber site 200 and remote user location 201 is simply terminated or never established (in the case where the failed request was the initial request for connection).

As stated above, to efficiently facilitate the transmission of a compressed video signal representing a typical program, it will typically be necessary to alter the transmission rate within RVBR network 202 every few seconds (due to varying levels of motion and/or light from scene to scene). The compressed video data within video source 207 is shown to be stored in n segments ($S_0$–$S_n$), each of which corresponds to a portion of an overall video program that is to be transmitted at a particular rate via RVBR network 202. The instant invention provides an efficient means and method for effecting this segmentation.

As shown in FIG. 2, video pre-processor 218 is linked to video source 207 and video data transmission rate memory 208 via lines 219 and 220, respectively. Unsegmented compressed video data is received by video pre-processor 218 via line 221. This incoming unsegmented video signal is analyzed and segmented by video pre-processor. For standard compressed video, it is assumed that all segmentation will be effected by pre-processor 218 at frame boundaries (these boundaries provide convenient junctures as they are already part of the incoming video data format). In performing the video analysis and segmentation, overall network renegotiation/transmission cost is calculated as a function of $\phi$, $\gamma$, $r_i$ and $s_i$; where $\phi$ is the cost of performing a network bandwidth renegotiation within RVBR network 202, $\gamma$, is the cost of utilizing a given amount of bandwidth within RVBR network 202 for a unit time, $r_i$ is the amount of video data entering video pre-processor 218 during interval i, and $s_i$ is the service rate that will required within RVBR network 202 to effectively transmit $r_i$ video data. Accordingly, the total network renegotiation/transmission cost for video signal representing N-1 time periods, each having a constant, arbitrary duration i, is given by:

$$\phi \cdot \sum_{i=1}^{N-1} (1 - \delta(s_{i-1}, s_i)) + \gamma \cdot \sum_{i=0}^{N-1} s_i$$

where $$\delta(s_x, s_y) = \left\{ \begin{array}{l} 1 \text{ if } s_x = s_y \\ 0 \text{ otherwise} \end{array} \right\}.$$

The $\delta(s_x, s_y)$ variable will cause the $\phi$ component of the cost to drop to zero when there is no change in the service rate $s_i$ from one period to the next (no renegotiation would be required, therefore renegotiation cost, $\phi$, is zero). The duration of a time period i is typically on the order of 1 ms for most video signals. However, the optimal duration of the interval i is a function of the specific content of the video signal being pre-processed. If the video signals typically introduced to the system of FIG. 2 have a very high level of action or light level variability, then the duration of the interval i may be shortened to improve the quality of the video delivered to user location 201.

Figure 3:
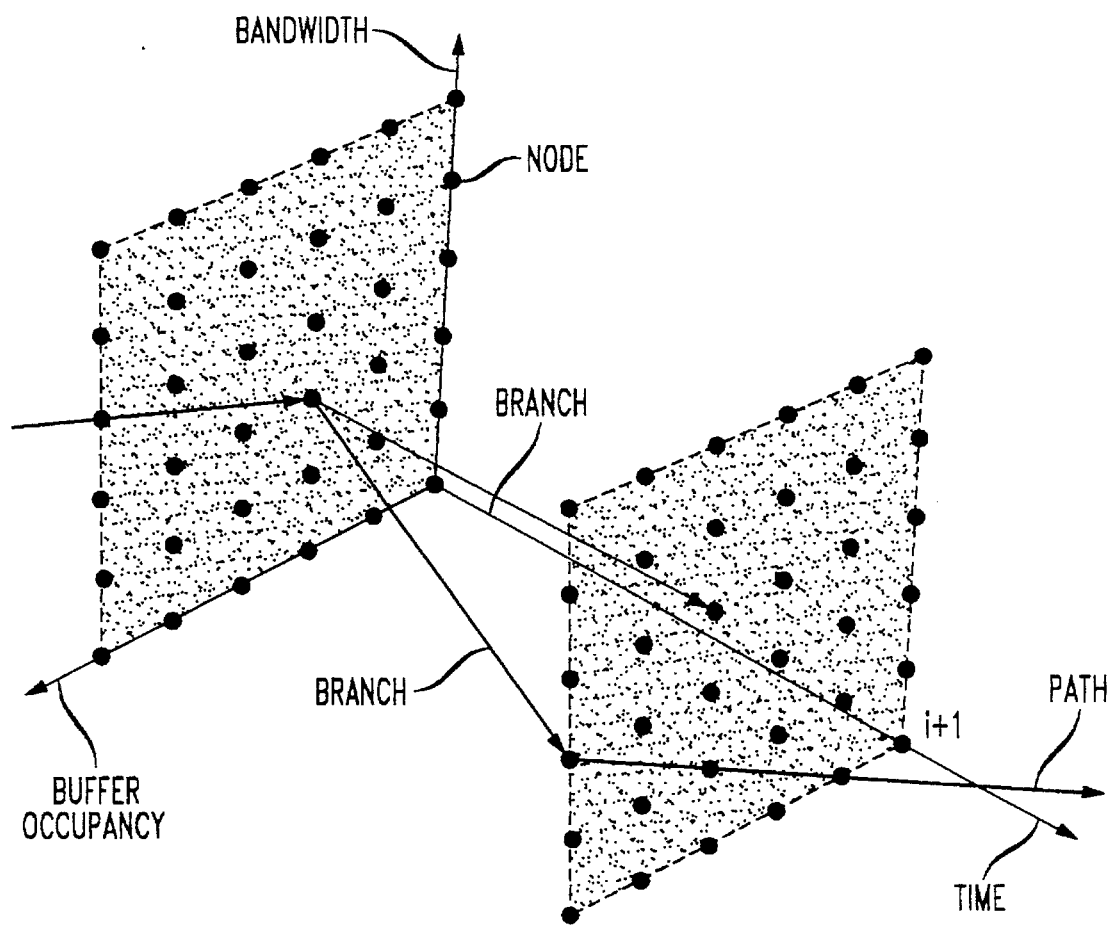
FIG. 3 shows, a graphical representation of nodal modeling for data segmentation in accordance with the invention.

For a given service rate $r_i$ video pre-processor 218 is programmed to minimize costs employing a Viterbi-like process subject to the constraint of source buffer 206 having a size B, and $b_i$ is the amount of compressed video data that actually resides in source buffer during the transmission of interval i video. Viterbi data optimization/manipulation is well-known in the art (see A. J. Viterbi and J. K Omura, Principles of Digital Communication and Coding, copyright 1979, McGraw-Hill). The cost minimization is performed within pre-processor utilizing the construct of a node. For purposes of this optimization a node is defined as a 4-tuple of data comprised of the values i, k, b and w; where i denotes the duration of an arbitrary interval, k denotes bandwidth allocation within RVBR network 202, b denotes source buffer 206 occupancy, and w denotes weight, which is indicative of the partial cost of obtaining the best (i.e., most cost effective) path to the node in question. Each node represents a particular state for RVBR network 202, and are modeled as being connected by branches having a weight (cost). A series of branches effected over time comprise a path, and a full path would be a sequence of N-1 branches connecting the node containing i=0 to the node containing i=(N-1). A graphical representation of this nodal modeling is provided in FIG. 3.

The optimization/cost minimization is performed within video pre-processor as follows:

1) The initial set of node for i=0 are created. These nodes will consist of a set having the form (0,k,0,0), where k assumes values from 0 to the maximum bandwidth available within RVBR network 202.

2) Create all branches between the present i node and i+1 node. Calculate the cost of each branch according to the previously discussed network renegotiation/transmission cost equation.

3) Prune all non-optimal paths. This pruning is performed on the basis that a path going through a particular node x, where the 4-tuple of x is $(i,k_x,b_x, w_x)$, cannot be optimal if there exists a path Y through node y, where the 4-tuple of y is $(i,k_y,b_y,w_y)$, such that $$b_y \leq b_x \text{ and } w_y \leq w_x + \left\{ \begin{array}{l} \phi \text{ if } k_y \neq k_x \\ 0 \text{ otherwise} \end{array} \right\}$$

Increment i and repeat steps 2 and 3 as long as i ≦N.

5) Select the one path with the minimum weight as the path that will be used.

The segmentation of the video for interval i is defined by the selected optimal path. Video pre-processor stores the defined video segment in a memory location within video source 207, and stores a record of the transmission rate associated with the segment in video data transmission rate memory 208.

The above described operations and processes that are performed upon the video data entering video pre-processor 218 are all well within the capabilities of a standard microprocessor. None of this pre-processing need be accomplished in real time as the segmented video is only being stored in video source 207. Retrieval and viewing of the stored segmented video is performed at a time after all pre-processing has been completed by network systems that are wholly independent of video pre-processor 208.

It will be understood that the particular embodiments and methods described above are only illustrative of the principles of the present invention, and that various modifications could be made by those skilled in the art without departing from the scope and spirit of the present invention, which is limited only by the claims that follow. For example, one such modification would include employing the invention within an RCBR network, or a private network. The invention could also be adapted to system that transmit digital data that other than compressed video.

We claim:

1. A data transmission system comprising:

a first site, including a first memory storing a series of data segments, and a second memory storing a previously compiled record of instantaneous transmission rates, each of said stored rates being associated with one or more of said stored data segments;

a second site;

a variable bit-rate network providing a connection between said first and said second sites;

a network controller adapted to negotiate a connection between said first site and said second site having a particular bandwidth in response to the contents of said second memory;

a data buffer, interposed between said first site and said variable bit-rate network, and adapted to store a finite amount of data segments; and a data pre-processor adapted to optimally segment incoming data so as to minimize the cost of negotiating and effecting the transmission of said segmented data from said first site to said second site via said data buffer and said variable bit-rate network, store said optimally segmented data in said first memory, and store a record indicative of the instantaneous transmission rate associated with each of said stored segments in said second memory.

2. The invention of claim 1 wherein said data segments represent a video signal.

3. The invention of claim 1, wherein said cost of negotiating and effecting the transmission of data segments from said first site to said second site via said data buffer and said variable bit-rate network is determined within said data pre-processor on the basis of the cost of modifying the state of said variable bit-rate network, where a given state is defined by bandwidth allocation (k) within said variable bit-rate network during arbitrary interval i, data buffer occupancy (b) during arbitrary interval i, and the partial cost of obtaining the path (w) to the desired variable bit-rate network state.

4. The invention of claim 3 wherein said data segments represent a video signal.

5. The invention of claim 1, wherein said cost of negotiating and effecting the transmission of data segments from said first site to said second site via said data buffer and said variable bit-rate network is determined within said data pre-processor on the basis of the cost of modifying the state of said variable bit-rate network, where a given state is defined by bandwidth allocation (k) within said variable bit-rate network during arbitrary interval i, data buffer occupancy (b) during arbitrary interval i, and the costs incurred during interval i obtaining a portion of the most cost effective path (w) to the final desired variable bit-rate network state.

6. The invention of claim 5 wherein said data segments represent a video signal.

7. A method for processing data for segmented transmission from a first site to a second site via a data buffer and a variable bit-rate network, comprising the steps of:

segmenting data as a function of the cost of negotiating and transmitting segments from said first site to said second site via said data buffer and said variable bit-rate network, wherein said cost for N-1 intervals is calculated as:

$$\phi \cdot \sum_{i=1}^{N-1} (1 - \sigma(s_{1-i}, s_i)) + \gamma \cdot \sum_{i=0}^{N-1} s_i,$$

where $\phi$ is the cost of performing a network bandwidth renegotiation within said variable bit-rate network, $\gamma$ is the cost of utilizing a given amount of bandwidth within said variable bit-rate network for a unit time, $r_i$ is the amount of data processed during an arbitrary interval i, $s_i$ is the service rate required within said variable bit-rate network to effectively transmit data $r_i$, and $$\delta(s_x,s_y) = \left\{ \begin{array}{l} 1 \text{ if } s_x = s_y \\ 0 \text{ otherwise} \end{array} \right\};$$

storing said segmented data in a first memory; and compiling said storing a record of instantaneous transmission rates, each of said stored rates being associated with one or more of said stored data segments.

8. The invention of claim 7 wherein said data segments represent a video signal.

9. The invention of claim 7, wherein said cost of negotiating and transmitting data segments from said first site to said second site via said data buffer and said variable bit-rate network is assessed as a function of the state of said variable bit-rate network; wherein said state is defined by data comprising information representing an arbitrary interval duration (i), bandwidth allocation (k) within said variable bit-rate network, data buffer occupancy (b), and the partial cost of obtaining the most cost effective path (w) to the next desired variable bit-rate network state.

10. The invention of claim 9 wherein said data segments represent a video signal.

11. The invention of claim 9, wherein said assessment of said cost of negotiating and transmitting data segments from said first site to said second site via said data buffer and said variable bit-rate network, further comprises the following steps:

a) creating an initial set of nodes, each representing a particular state of said variable bit-rate network for an initial interval i=0, and comprising a data set having the form (k0,b0=0,w0=0), where k assumes values from 0 to the maximum bandwidth available within said variable bit-rate network;

b) calculating and creating a record of all possible path portions between the initial node i and i+1 node;

c) calculating the cost of each path portion according to the previously discussed network renegotiation/transmission cost for N-1 intervals as:

$$\phi \cdot \sum_{i=1}^{N-1} (1 - \sigma(s_{1-i}, s_i)) + \gamma \cdot \sum_{i=0}^{N-1} s_i,$$

where $\phi$ is the cost of performing a network bandwidth renegotiation within said variable bit-rate network, $\gamma$ is the cost of utilizing a given amount of bandwidth within said variable bit-rate network for a unit time, $r_i$ is the amount of data processed during an arbitrary interval i, $s_i$ is the service rate required within said variable bit-rate network to effectively transmit data $r_i$, and $$\delta(s_x,s_y) = \left\{ \begin{array}{l} 1 \text{ if } s_x = s_y \\ 0 \text{ otherwise} \end{array} \right\};$$

d) pruning all non-optimal path portions, wherein a non-optimal path portion is defined as any path portion X going through a particular node x for a particular interval, where there exists a path portion Y through node y during said particular interval, such that e) repeating steps c and d until a path to the next desired variable bit-rate network state is completed.

12. The invention of claim 11 wherein said data segments represent a video signal.

* * * * *